UNITED STATES PATENT OFFICE.

HEINRICH SCHOLZ, OF BERLIN, GERMANY, ASSIGNOR TO BERNHARD GRATZ, OF BERLIN, GERMANY.

PROCESS OF PREPARING INDIA-RUBBER FOR VULCANIZATION.

No. 891,866.

Specification of Letters Patent.

Patented June 30, 1908.

Application filed February 27, 1906. Serial No. 303,217.

*To all whom it may concern:*

Be it known that I, HEINRICH SCHOLZ, a subject of the King of Prussia, residing at Berlin, in the Kingdom of Prussia and German Empire, have invented certain new and useful Improvements in Processes of Preparing India-Rubber for Vulcanization, of which the following is a specification.

For the purpose of vulcanization india-rubber, as is well-known, is treated with sulfur at 130–150 degrees centigrade. The product is only perfectly homogeneous in structure, if the rubber was altogether free from resin. In the rubber industry, however, the best washed rubber always contains some 1 to 20 per cent. of resinous, oily or waxy matter. This melts at the vulcanizing temperature (130–150° cent.), and in the melted condition likewise absorbs sulfur, causing a disturbing reaction, which affects the homogeneity of the vulcanized rubber. These inconveniences can be entirely overcome by means of the present invention.

According to my invention the rubber to be vulcanized is specially prepared for the sulfur treatment by being freed from those ingredients which interfere with proper vulcanization. For this purpose the rubber (which if dirty should be first thoroughly cleaned in well-known manner) is treated preferably with hot resin-solvents which behave indifferently or neutrally in regard to rubber (such as glacial acetic acid, or amyl alcohol, or other alcohols, or acetone), after which the rubber is washed and dried, and then vulcanized in the usual manner. The vulcanization of such resin-free rubber proceeds rapidly without any disturbing reaction, and the product is of a perfectly homogeneous character.

The treatment of the impure rubber may be carried on exceedingly rapidly and to great advantage, if glacial acetic acid or amyl alcohol is employed. If pure amyl alcohol is used in boiling condition, it dissolves the resin very rapidly, but at the high temperature (130–140 degrees cent.) which is very near the melting-point of rubber, it will seriously attack the latter. In order to avoid this, the temperature should be kept so low as not to affect the rubber. This may be done by adding water to the amyl alcohol, whereby in boiling with the aid of a reflux-cooler the temperature is maintained at 100° cent. owing to the presence of water. Since amyl alcohol does not dissolve in water, the addition of water is harmless and the solvent capacity of the alcohol is not diminished by the water. The resins may be separated from the amyl alcohol by distilling with steam, the alcohol passing over with the latter and separating from the water in the receiver, as it does not mix with water. The resins remain behind in the still. This method of separation has the advantage over simple distillation, that the resins do not suffer by the high boiling-temperature.

What I do claim as my invention and desire to secure by Letters Patent, is—

The method of preparing rubber for vulcanization consisting in boiling the rubber with amyl alcohol with the simultaneous addition of water thereby keeping down the temperature below the melting point of the rubber.

In testimony whereof I have affixed my signature in presence of two witnesses.

HEINRICH SCHOLZ.

Witnesses:
BERNHARD GRATZ,
KARL GARZ.